United States Patent
Kikin-Gil et al.

(10) Patent No.: US 10,409,901 B2
(45) Date of Patent: Sep. 10, 2019

(54) PROVIDING COLLABORATION COMMUNICATION TOOLS WITHIN DOCUMENT EDITOR

(71) Applicant: MICROSOFT TECHNOLOGY LICENSING, LLC, Redmond, WA (US)

(72) Inventors: Ruth Kikin-Gil, Redmond, WA (US); Patrick Davis, Redmond, WA (US); Shikha Desai, Redmond, WA (US); Seyit Yilmaz, Redmond, WA (US); Wesley Hodgson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 622 days.

(21) Appl. No.: 14/857,980

(22) Filed: Sep. 18, 2015

(65) Prior Publication Data
US 2017/0083490 A1 Mar. 23, 2017

(51) Int. Cl.
G06Q 10/10 (2012.01)
G06F 17/24 (2006.01)
H04L 12/58 (2006.01)

(52) U.S. Cl.
CPC .......... *G06F 17/24* (2013.01); *G06Q 10/101* (2013.01); *G06Q 10/107* (2013.01); *H04L 51/16* (2013.01)

(58) Field of Classification Search
CPC ..... G06F 17/24; G06F 17/241; G06Q 10/101; G06Q 10/107; H04L 51/16
USPC .......................................................... 715/753
See application file for complete search history.

(56) References Cited

U.S. PATENT DOCUMENTS

| | | | |
|---|---|---|---|
| 7,730,411 B2 | 6/2010 | Chotai et al. | |
| 8,312,385 B2 | 11/2012 | Bier | |
| 8,447,886 B2 | 5/2013 | Rochelle et al. | |
| 8,464,164 B2 | 6/2013 | Hon et al. | |
| 8,666,961 B1 | 3/2014 | Qureshi et al. | |
| 8,739,021 B2 | 5/2014 | Yuniardi | |
| 2003/0179230 A1 | 9/2003 | Seidman | |
| 2006/0224937 A1* | 10/2006 | Sudoh | G06F 3/048 715/201 |
| 2007/0174384 A1 | 7/2007 | Abd-El-Malek et al. | |
| 2010/0287163 A1 | 11/2010 | Sridhar et al. | |
| 2010/0306670 A1 | 12/2010 | Quinn et al. | |
| 2011/0202594 A1* | 8/2011 | Ricci | H04M 3/4931 709/203 |

(Continued)

OTHER PUBLICATIONS

"Dialogs and Sidebars in Google Apps", Published on: Nov. 12, 2013, Available at: https://developers.google.com/apps-script/guides/dialogs.

(Continued)

*Primary Examiner* — Jennifer N To
*Assistant Examiner* — Amy P Hoang

(57) ABSTRACT

Collaboration communication tools within a document editor are provided. An application such as a document authoring application displays a document and a communication panel adjacent to the document. The communication panel presents a conversation associated with the document. Communications and/or conversations associated with the documents may be obtained from different applications and aggregated to be presented in conjunction with the document. A new entry is detected for an insertion into the conversation associated with the document. The new entry is inserted into the conversation. An insertion of a section of the document into the conversation is also detected. The section of the document is tracked. The section of the document is displayed embedded into the conversation within the communication panel.

20 Claims, 7 Drawing Sheets

(56) References Cited

U.S. PATENT DOCUMENTS

| | | | |
|---|---|---|---|
| 2012/0136952 A1* | 5/2012 | Mulder | G06F 17/2211 709/206 |
| 2014/0129645 A1 | 5/2014 | Mo | |
| 2014/0289645 A1 | 9/2014 | Megiddo et al. | |
| 2014/0310345 A1 | 10/2014 | Megiddo et al. | |
| 2014/0310613 A1 | 10/2014 | Megiddo et al. | |
| 2015/0040029 A1* | 2/2015 | Koum | H04L 51/10 715/748 |
| 2015/0082189 A1* | 3/2015 | Baer | G06F 3/04842 715/752 |
| 2016/0182412 A1* | 6/2016 | Kabbes | H04L 51/34 709/206 |

OTHER PUBLICATIONS

"Starting Yammer conversations from documents stored in SharePoint Online", Published on: Sep. 12, 2013, Available at: http://blogs.office.com/2013/09/12/starting-yammer-conversations-from-documents-stored-in-sharepoint-online/.

"Document Collaboration and Co-Authoring", Retrieved on: May 28, 2015, Available at: https://support.office.com/en-in/article/Document-collaboration-and-co-authoring-ee1509b4-1f6e-401e-b04a-782d26f564a4?ui=en-US&rs=en-IN&ad=IN.

"Quip Tour", Retrieved on: Jun. 8, 2015. Available at: https://quip.com/about/tour.

"Second Written Opinion Issued in PCT Application No. PCT/US2016/050843", dated Aug. 1, 2017, 9 Pages.

"International Search Report and Written Opinion Issued in PCT Application No. PCT/US2016/050843", dated Oct. 19, 2016, 12 Pages.

"International Preliminary Report on Patentability Issued in PCT Application No. PCT/US2016/050843", dated Jan. 19, 2018, 10 Pages.

* cited by examiner

PROVIDING COLLABORATION COMMUNICATION TOOLS WITHIN DOCUMENT EDITOR

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as hand-held computers, smart phones, tablet devices, and comparable devices have become common. Such devices execute a wide variety of applications ranging from communication applications to productivity tools. Many such applications help authoring of content. Communications between collaborators of a document may be dispersed across multiple applications. Today, it is difficult to access all the communication around a document in one place.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to collaboration communication tools within a document editor. In some examples, a document authoring application may display a document and a communication panel adjacent to the document. The communication panel may present a conversation associated with the document. The conversation may include a first participant and a second participant. A new entry may be detected for an insertion into the conversation associated with the document. The new entry may be inserted into the conversation. An insertion of a section of the document into the conversation may also be detected. The section of the document may be tracked. The section of the document may be displayed embedded into the conversation within the communication panel.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
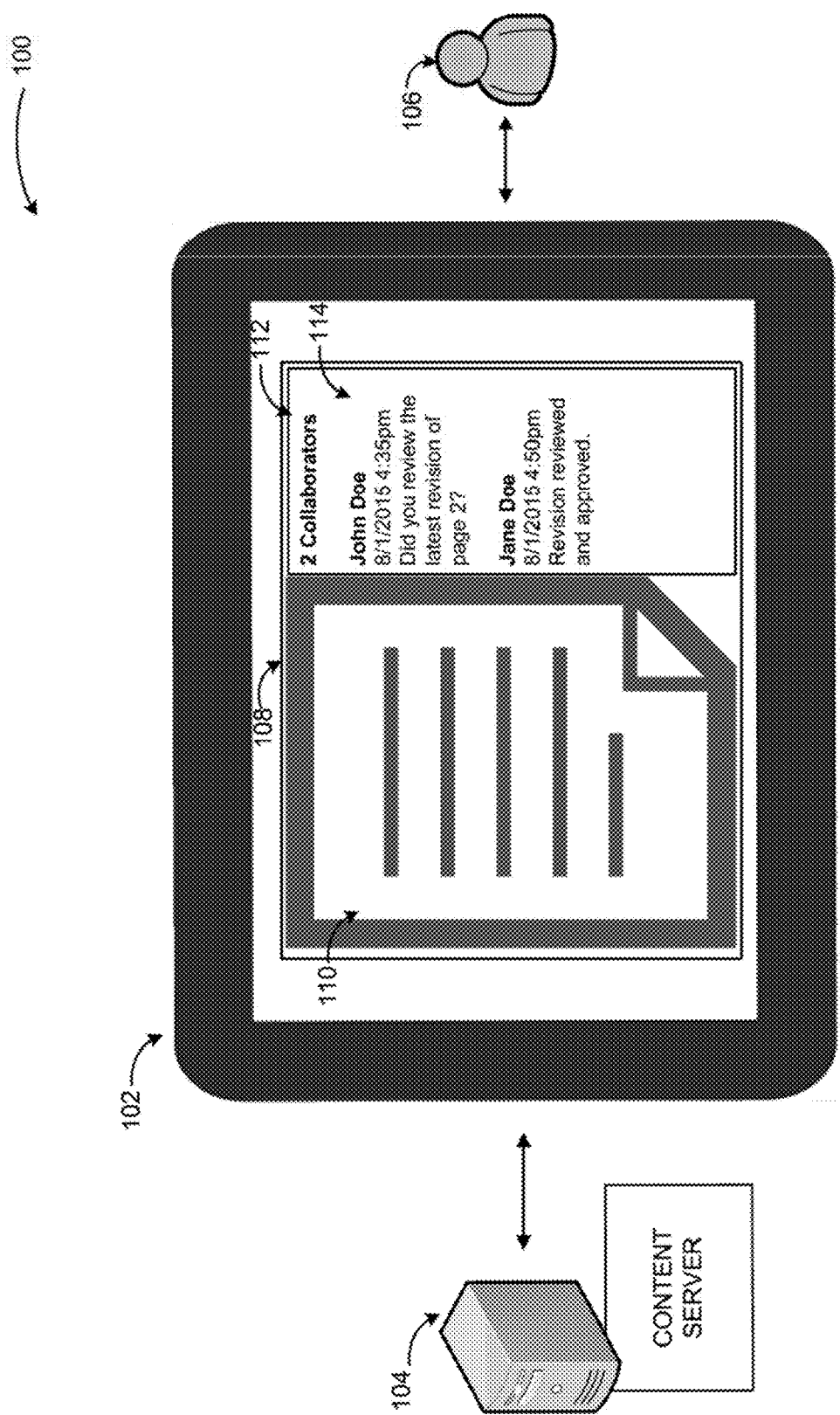
FIG. 1 is a conceptual diagram illustrating an example of providing collaboration communication tools within a document editor, according to embodiments.

As briefly described above, collaboration communication tools within a document editor may be provided by a document authoring application. The document authoring application may display a document and a communication panel adjacent to the document. The communication panel may present a conversation associated with the document. Communications and/or conversations associated with the documents may be obtained from different applications and aggregated to be presented in conjunction with the document.

In some examples, changes to the authored document (for example, insertions) may be reflected in the associated conversation such as via a text message, an image, a graph, an interactive map, a video, and/or an attachment, for example, a corresponding action performed on the document. In other examples, the changes to the document may be displayed as embedded into the conversation within the communication panel in an expanded or collapsed state.

In the following detailed description, references are made to the accompanying drawings that form a part hereof, and in which are shown by way of illustrations, specific embodiments, and/or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide collaboration communication tools within a document editor. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, and/or a wearable computer. A memory may be a removable and/or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, and/or similar content. An operating system is a system configured to manage hardware and software components of a computing device that provides common services and applications. An integrated module is a component of an application and/or service that is integrated within the application and/or service such that the application and/or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application and/or service through which a user interacts with the application and/or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application and/or service that enable the application and/or service to interact or communicate with one or more other applications and services managed by separate entities.

FIG. 1 is a conceptual diagram illustrating an example of providing collaboration communication tools within a document editor, according to embodiments.

In a diagram 100, a computing device 102 may execute a document authoring application 108. The computing device 102 may include a tablet device, a laptop computer, a desktop computer, and/or a smart phone, among others. The computing device 102 may display the document authoring application 108 to a user 106. The user 106 may be allowed to interact with the document authoring application 108 through an input device and/or touch enabled display component of the computing device 102. The computing device 102 may include a display device such as the touch enabled display component, and a monitor, among others to provide the document authoring application 108 to the user 106.

The document authoring application 108 may display a document 110 and a communication panel 112 adjacent to the document 110. The communication panel 112 may present a conversation 114 associated with the document 110. The conversation 114 may include a first participant such as the user 106 and a second participant such as a third party user that accesses the conversation through a communication application hosted by another device. An example of the communication application may include an email application, a messaging application, among others that displays the conversation 114 to the second participant.

A new entry may be detected for an insertion into the conversation associated with the document 110. The new entry may include a text message. The new entry may be inserted into the conversation 114.

An insertion of a section of the document 110 into the conversation 114 may also be detected. The section of the document 110 may be tracked for a change operation. The section of the document may be displayed as embedded into the conversation 114 within the communication panel 112. In some embodiments, closing of the conversation 114 may be interpreted as termination of change tracking on the document 110 and the change tracking may be stopped upon closing of the conversation 114.

The user 106 may interact with the document authoring application 108 through a keyboard based input, a mouse based input, a voice based input, a pen based input, and/or a gesture based input, among others. The gesture based input may include one or more touch based actions such as a touch action, a swipe action, and/or a combination of each, among others.

The document authoring application 108 may store the document 110 locally or in the cloud. For example, the document 110 may be retrieved from a content service hosted by a content server 104. The content server 104 may include a web server, a document server, among others. The computing device 102 may communicate with the content server 104 through a network. The network may provide wired and/or wireless communications between nodes such as the computing device 102, and/or the content server 104, among others.

While the example system in FIG. 1 has been described with specific components including the computing device 102, the document authoring application 108, the communication panel 112, and the conversation 114, embodiments are not limited to these components or system configurations and can be implemented with other system configuration employing fewer or additional components.

Figure 2:
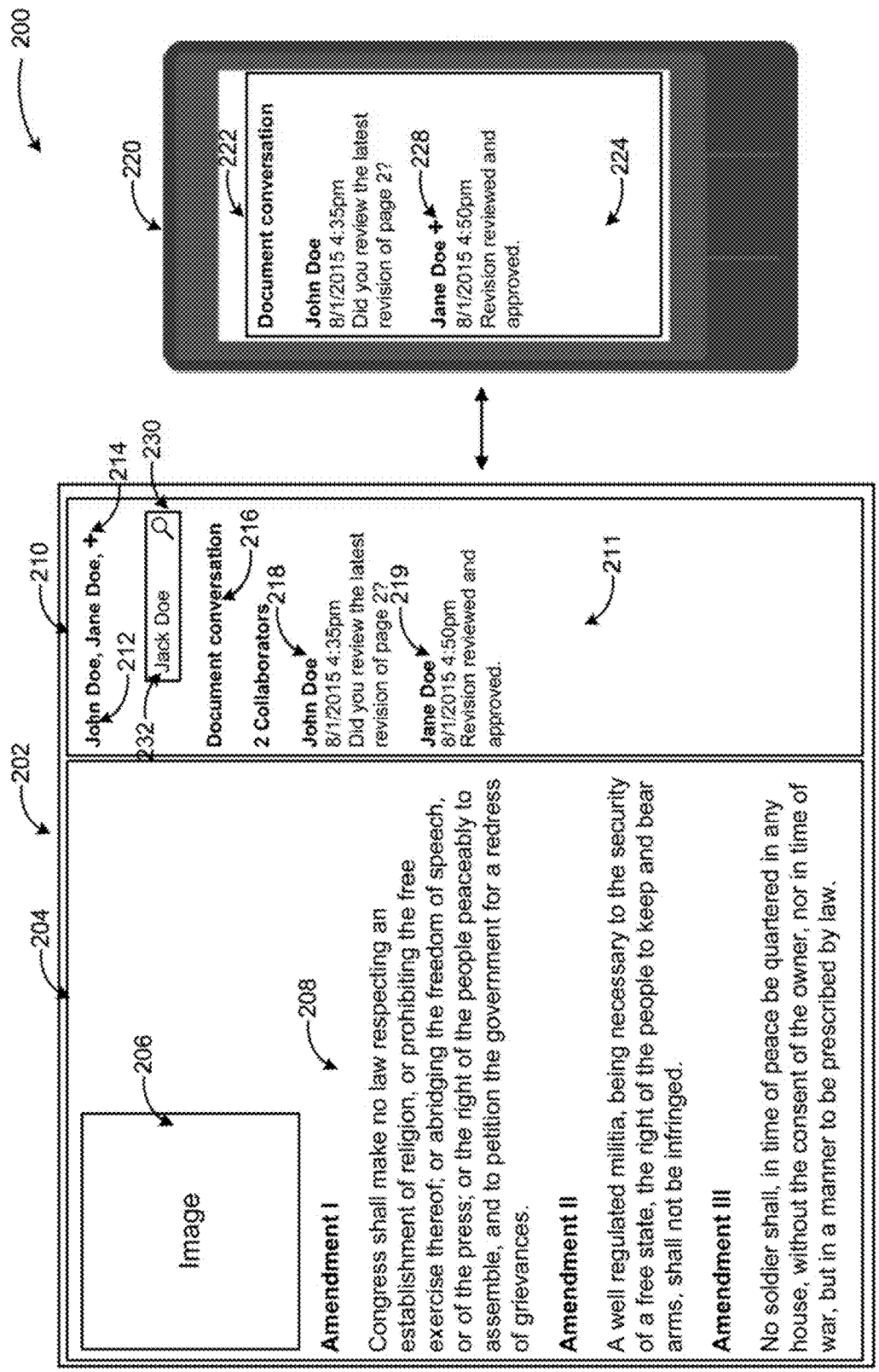
FIG. 2 is a display diagram illustrating an example of a conversation provided within collaboration communication tools in a document editor, according to embodiments.

FIG. 2 is a display diagram illustrating an example of a conversation provided within collaboration communication tools in a document editor, according to embodiments.

In a diagram 200, a document authoring application may display a document 204 through a user interface 202 and a communication panel 210 adjacent to the document 204 within the user interface 202. The document 204 may have multiple sections. Examples of the sections of the document 204 may include an image 206, text 208, a paragraph, and/or a table, among others.

A conversation 211 may be displayed within the communication panel 210. The conversation 211 may be associated with the document 204. The conversation 211 may include multiple participants. A first participant 218 and a second participant 219 may participate in the conversation 211. The first participant 218 and the second participant 219 may also be identified in a header section 212 of the communication panel.

An add participant control element 214 may also be provided. In response to an activation of the add participant control element 214, a participant search panel 230 may be displayed to prompt for an identification of a third participant to add to the conversation 211.

The conversation 211 may also be transmitted to a communication application 222 hosted by device 220. The communication application 222 may include a text messaging application, an email messaging application, and/or a video/audio conferencing application, among others. The communication application 222 may be prompted to present the conversation 211 as a conversation 224 displayed on the device 220. The presented content and format of conversation 224 may be the same as conversation 211 or modified (for example, adjusted based on display capabilities of the device 220). In an example scenario, the second participant 219 may interact with the conversation 211 through the communication application 222 that presents a synchronized copy of the conversation 211 as the conversation 224.

In response to a detected activation of the add participant element 214, the participant search panel 230 may be displayed to prompt for an identification of a third participant 232. In response to a detected input into the participant search panel 230 that identifies the third participant 232, the third participant 232 may be added into the conversation 211. The third participant 232 may be notified of an availability to participate in the conversation 211.

A communication application associated with the third participant 232 may also be identified. For example, the third participant 232 may be a member of the same organization as the participants of the conversation 211 or part of a common project, etc. The conversation 211 may be transmitted to the communication application to prompt the communication application to present the conversation 211 to the third participant 232. In some embodiments, the entire conversation may be transmitted. In other embodiments, part of the conversation 211 may be transmitted. For example, a portion of the conversation related to the third participant 232 or a portion of the conversation following the addition of the third participant 232 may be transmitted.

An organizational personnel service may also be searched to locate a match for the third participant 232. In response to locating the third participant 232 in the personnel service, presence information associated with the third participant 232 may be retrieved. The presence information may include a location, and/or a status, among other presence information of the third participant 232. The third participant 232 and the presence information of the third participant 232 may be added into the conversation 211 to display the third participant 232 with the presence information.

An entry within the conversation 211 may identify a participant who inserted the entry. The entry may include a time stamp and a date stamp to provide a time of insertion into the conversation 211. The entry may also include a text, an image, and/or an attachment, among others.

An identification of the document 204 and an identification of the conversation 211 may be displayed as a title 216 of the conversation 211. The identification of the document 204 may include a title, a type, a category, and/or a role, among others associated with the document. The identification of the conversation 211 may include a description, and/or a timestamp, among others associated with the conversation 211. Communication collaboration tools according to some embodiments may enable communication about the document and responses by text, email, and other communication methods. Furthermore, content received from external communication methods may update the conversation and/or the document content itself.

Figure 3:
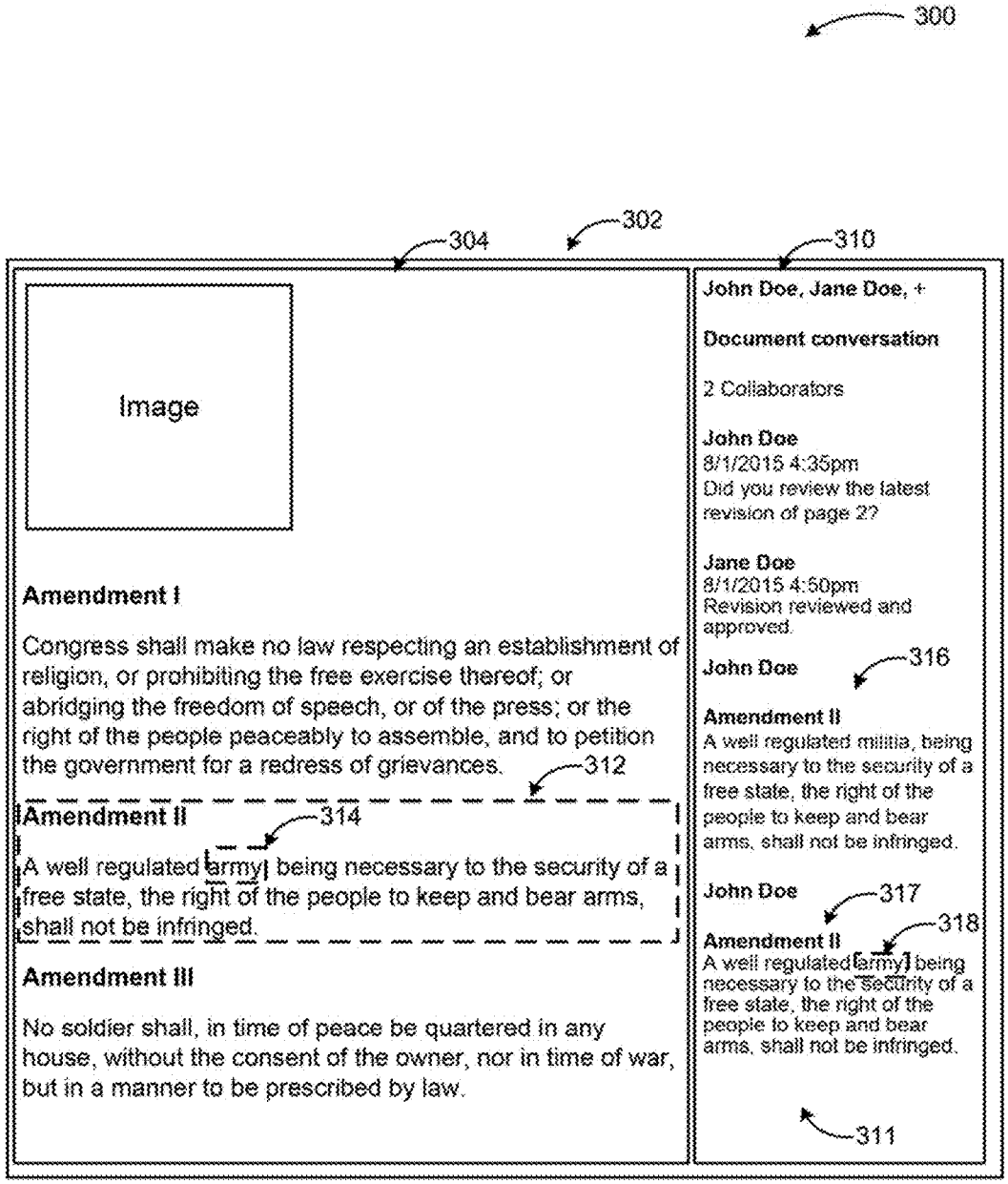
FIG. 3 is a display diagram illustrating an example of a section of a document tracked with collaboration communication tools within a document editor, according to embodiments.

FIG. 3 is a display diagram illustrating an example of a section of a document tracked with collaboration communication tools within a document editor, according to embodiments.

In a diagram 300, a document authoring application may track a section 312 of a document 304 for a change operation applied on the section 312. The change-tracked document 304 may be shown on user interface 302. The section 312 may be tracked in response to an insertion of the section 312 into a conversation 311. The conversation 311 may be displayed within a communication panel 310 displayed adjacent to the document 304 within the user interface 302.

In response to a detection of a change 314 applied to an item within the section 312 of the document 304, a previous version 316 of the section 312 may be inserted into the conversation 311. The previous version 316 may include the section 312 prior to an application of the change 314.

A current version 317 of the section 312 of the document 304 may also, or alternatively, be inserted into the conversation 311. The current version 317 may include the section 312 after an application of the change 314. A change 318 in the current version 317 may be highlighted. Furthermore, a notification may be transmitted to participants to inform the participants of an insertion of the change 314 to the section 312 of the document 304.

Alternatively, the participants may be subscribed to receive a notification in response to a detected change on any section of the document 304. In response to the detected change in one of the sections of the document 304, the notification may be transmitted to the participants to inform the participants of the change.

A notification may also be transmitted to the participants to inform the participants of a new entry inserted into the conversation 311. In response to an insertion of the new entry into the conversation 311, the notification maybe transmitted to the participants to inform the participants of the new entry.

Figure 4:
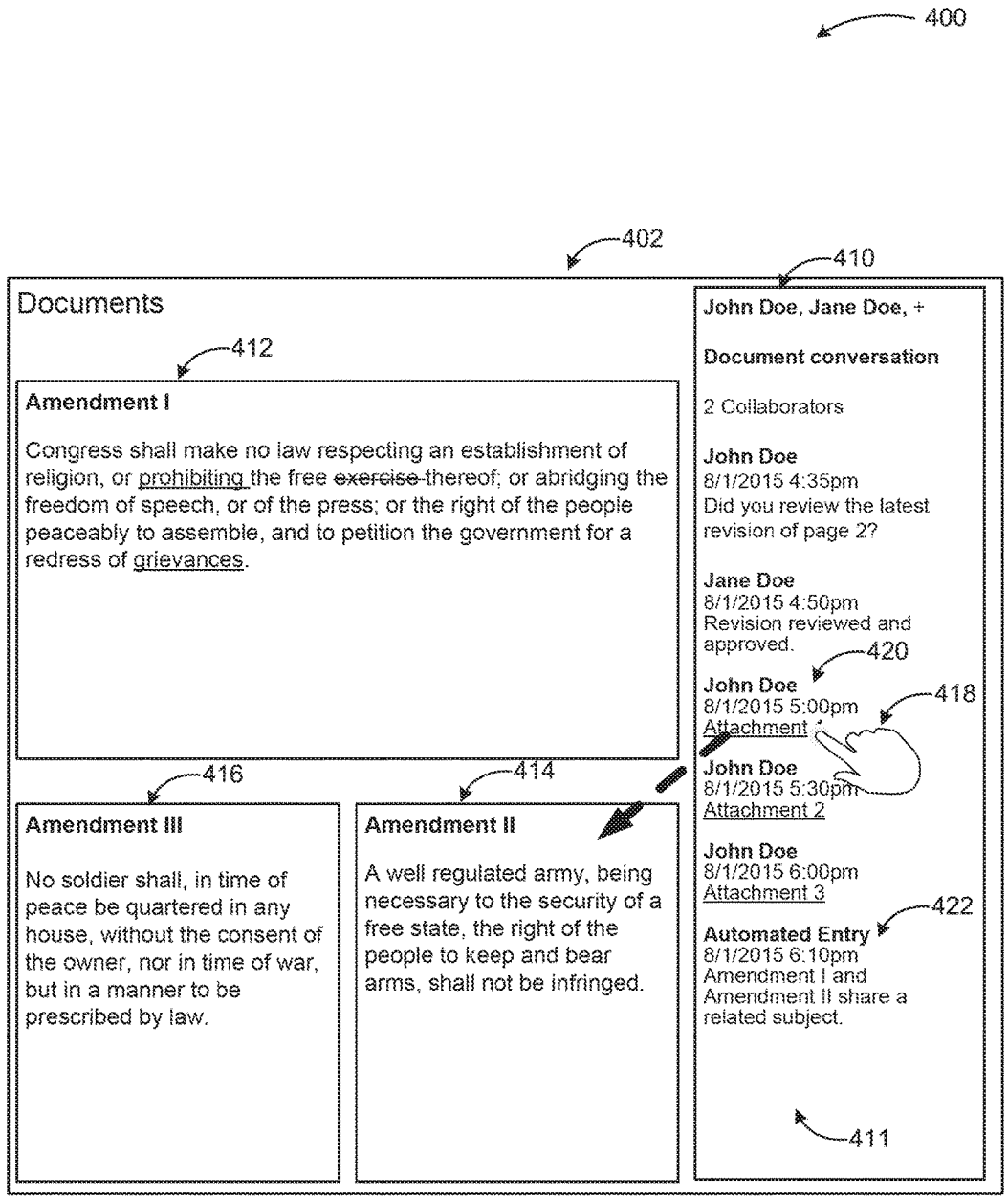
FIG. 4 is a display diagram illustrating an example of providing collaboration communication tools within a document editor for related documents, according to embodiments.

FIG. 4 is a display diagram illustrating an example of providing collaboration communication tools within a document editor for related documents, according to embodiments.

In a diagram 400, a document authoring application displays a document 412, on user interface 402. The document 412 may be a co-authored document, where collaborators of the document may exchange communications via a conversation 411 displayed on the communication panel 410 within the user interface 402. In an example scenario, a collaborator (participant 420 in the conversation 411) may insert new content into the document 412. The new content may be inserted in form of text directly inserted into the body of the document, an embedded object, or an attachment. The addition of the new content may be reflected in the conversation 411 as the addition of "Attachment 1" by participant 420. Moreover, another participant of the conversation may activate the link "Attachment 1" (418) on the conversation 411 and view the new content as first attachment 414 on the user interface 402 along with the document 412. Other insertions may also be displayed such as attachment 416.

In some embodiments, the document authoring application may detect that a participant has associated an attachment 416 with the document 412, such as by inserting the attachment 416 within the conversation 411 associated with the document 412. An automated entry 422 may provide information to the participants of the conversation about the relationship between the document 412 and the attachment 416, for example. To determine the relationship, the document authoring application may analyze the document 412 and the attachment 416 to identify the relationship between the document 412 and the attachment 416. Metadata of the attachment 416 and metadata of the document 412 may be compared to identify the relationship between the document 412 and the attachment 416. The relationship may include a related title, a related author, a related subject, and/or related components, among other.

As discussed herein, the application may be employed to perform operations associated with providing collaboration tools within a document editor. An increased user efficiency with the document authoring application 108 may occur as a result of presentation of a communication tool that displays a conversation between participants adjacent to a document. Tracking changes to a document and providing them via a communication tool may reduce processor load, increase processing speed, conserve memory, and reduce network bandwidth usage.

Embodiments, as described herein, address a need that arises from a lack of efficiency between the user 106 interacting with the document authoring application 108 of the computing device 102. The actions/operations described herein are not a mere use of a computer, but address results that are direct consequences of software used as a service offered to large numbers of users and applications.

The example scenarios and schemas in FIG. 1 through 4 are shown with specific components, data types, and configurations. Embodiments are not limited to systems according to these example configurations. Providing collaboration communication tools within a document editor may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
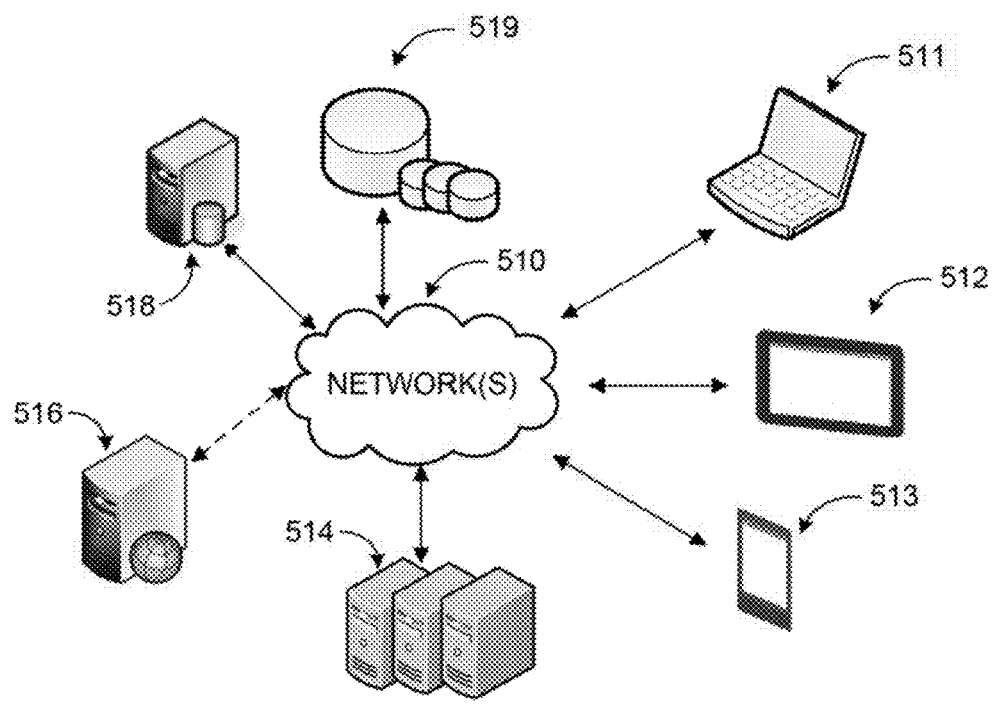
FIG. 5 is a simplified networked environment, where a system according to embodiments may be implemented.

FIG. 5 is an example networked environment, where embodiments may be implemented. A document authoring application configured to provide collaboration communication tools within a document editor may be implemented via software executed over one or more servers 514 such as a hosted service. For example, the document authoring application may be part of a cloud-based productivity service and authored document and/or related conversations may be stored in the cloud. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, and/or on individual server 516. Information associated with the authored document, related conversation, and associated data may be obtained from applications executed on client devices 511-513 or other devices. A document authoring application may display a document and a communication panel adjacent to the document. The communication panel may present a conversation associated with the document. The conversation may include participants. In response to a detected new entry, the new entry may be inserted into the conversation. In response to a detected insertion of a section of the document into the conversation, the section of the document may be tracked. The section of the document may be displayed embedded into the conversation within the communication panel. The document authoring application may store data associated with the document in data store(s) 519 directly and/or through database server 518.

Network(s) 510 may comprise any topology of servers, clients, Internet service providers, and communication media. A system according to embodiments may have a static and/or dynamic topology. Network(s) 510 may include secure networks such as an enterprise network, an unsecure network such as a wireless open network, and/or the Internet. Network(s) 510 may also coordinate communication over other networks such as Public Switched Telephone Network (PSTN) and/or cellular networks. Furthermore, network(s) 510 may include short range wireless networks. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide collaboration communication tools within a document editor. Furthermore, the networked environments discussed in FIG. 5 are for illustration purposes only. Embodiments are not limited to the example applications, modules, or processes.

Figure 6:
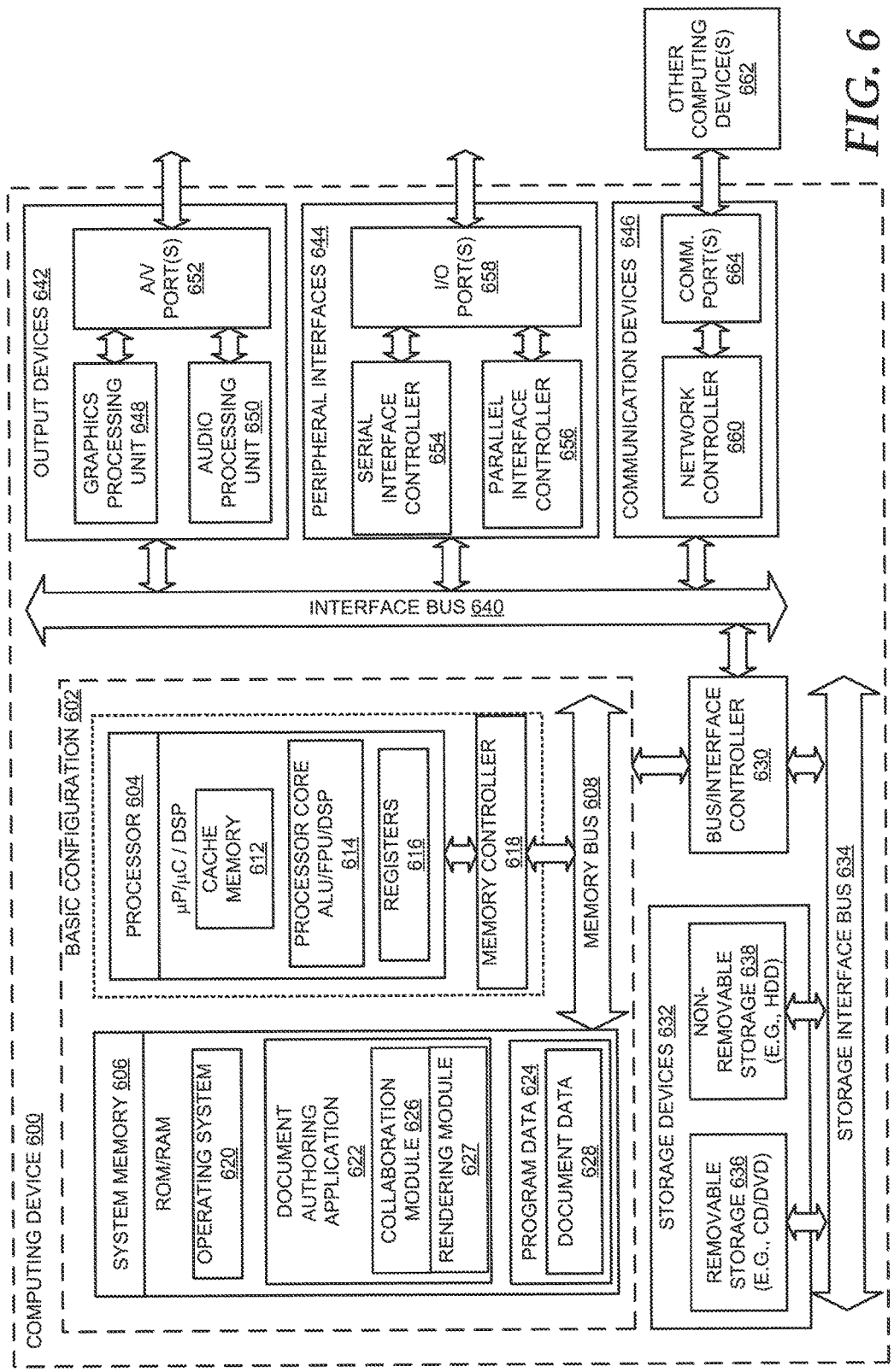
FIG. 6 is a block diagram of an example computing device, which may be used to provide collaboration communication tools within a document editor.

FIG. 6 is a block diagram of an example computing device, which may be used to provide collaboration communication tools within a document editor.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one or more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a document authoring application 622, and a program data 624. The document authoring application 622 may include a component such as a collaboration module 626 and a rendering module 627. The collaboration module 626 and the rendering module 627 may execute the processes associated with the document authoring application 622. The rendering module 627 may display a document and a communication panel adjacent to the document. The communication panel may present a conversation associated with the document. The conversation may include participants. In response to a detected new entry, the new entry may be inserted into the conversation by the collaboration module 626. In response to a detected insertion of a section of the document into the conversation, the section of the document may be tracked by the collaboration module 626. The section of the document may be displayed embedded into the conversation within the communication panel by the rendering module 627.

Components of the document authoring application 622 (such as a user interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a user interface of the document authoring application 622, displayed by the touch based device. The program data 624 may also include, among other data, document data 628, or the like, as described herein. The document data 628 may include a document, and a conversation associated with the document, among others.

The computing device 600 may have additional features and/or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the herein discussed functions. The computing device 600 may also be implemented as a personal computer including both laptop computer and non-laptop computer configurations.

Example embodiments may also include methods to provide collaboration communication tools within a document editor. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
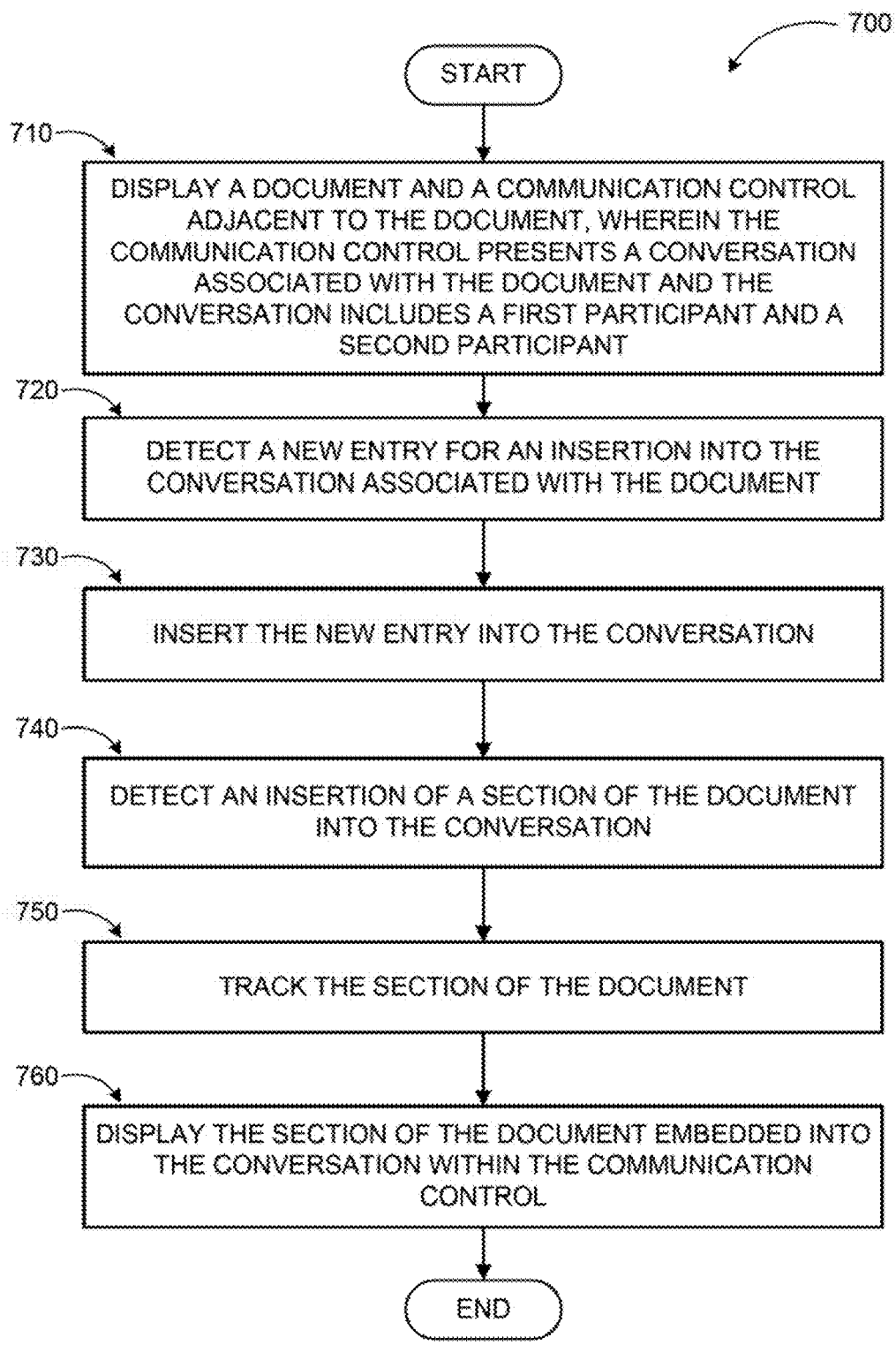
FIG. 7 is a logic flow diagram illustrating a process to provide collaboration communication tools within a document editor, according to embodiments.

FIG. 7 illustrates a logic flow diagram for a process to provide a collaboration communication tool within a document editor, according to embodiments. Process 700 may be implemented on a computing device such as the computing device 600 or other systems.

Process 700 begins with operation 710, where a document and a communication panel adjacent to the document may be displayed. The communication panel may present a conversation associated with the document. The conversation may include participants.

At operation 720, a new entry may be detected for an insertion into the conversation associated with the document. The new entry may include a text, an image, and/or an attachment, among others. The new entry may be inserted into the conversation at operation 730.

At operation 740, an insertion of a section of the document into the conversation may also be detected. The section of the document may be tracked for a change operation at operation 750. At operation 760, the section of the document may be displayed embedded into the conversation within the communication panel.

The operations included in process 700) are for illustration purposes. Providing collaboration communication tools within a document editor may be implemented by similar processes with fewer or additional steps, as well as in different order of operations using the principles described herein.

According to some examples, a computing device to provide collaboration communication tools within a document editor is described. The computing device may include a memory configured to store instructions associated with a document authoring application and one or more processors coupled to the memory, the one or more processors executing the document authoring application in conjunction with the instructions stored in the memory. The document authoring application may include a rendering module configured to present a document and a communication panel associated with the document, where the communication panel presents a conversation related to the document within a user interface associated with the document authoring application. The document authoring application may also include a collaboration module configured to detect a new entry for an insertion into the conversation related to the document; insert the new entry into the conversation related to the document; link the new entry with a specific location in the document; detect a change to the document; track the change in the document; and provide the new entry, the link of the new entry to the specific location in the document, and the tracked change to the rendering module to be displayed within the conversation related to the document through a display device.

According to other examples, the collaboration module may be further configured to transmit the conversation related to the document to a communication application executed on another computing device to prompt the communication application to present the conversation related to the document to a participant. The collaboration module may be further configured to receive the new entry from the communication application, detect a request to add a participant in connection with the change to the document, prompt the rendering module to present a participant search panel to enable an identification of the participant, and detect an input into the participant search panel that identifies the participant.

According to further examples, the collaboration module may be further configured to add the participant into the conversation related to the document and notify the participant of an availability to participate in the conversation related to the document in connection with the change to the document. The collaboration module may also be configured to identify a communication application associated with the participant and transmit the conversation related to the document to the communication application to prompt the communication application to present the conversation related to the document to the participant. The collaboration module may be further configured to enable the participant to access the change to the document through a user interface of the communication application, enable the participant to activate the document authoring application through a user interface of the communication application, and enable the participant to access the change to the document through the user interface of the document authoring application.

According to yet other examples, the rendering module may be further configured to present through the user interface of the document authoring application an identification and one or more properties of the document and the conversation related to the document. The collaboration module may be further configured to detect insertion of an attachment within the conversation related to the document, associate the attachment with the document by one or more of embedding the attachment as an object into the document and inserting a link to the attachment into the document, and notify participants of the conversation related to the document about the attachment. The collaboration module may also be configured to analyze a metadata associated with the attachment, compare the metadata associated with the attachment to a metadata associated with the document to identify a relationship between the document and the attachment, where the relationship includes one or more of: a related title, a related author, a related subject, and one or more related components, and present the identified relationship in the conversation related to the document.

According to other examples, a method executed on a computing device to provide collaboration communication tools within a document editor is described. The method may include presenting a document and a communication panel associated with the document, where the communication panel presents a conversation related to the document within a user interface associated with the document editor; detecting a new entry for an insertion into the conversation related to the document; inserting the new entry into the conversation related to the document; linking the new entry to a specific location within the document; detecting a change within the document; tracking the change within the document; and displaying the new entry, the link to the specific location within the document, and a reference to the tracked change within the conversation related to the document.

According to some examples, the method may further include providing a notification to one or more participants of the conversation related to the document about the tracked change; providing the notification through a communication application in form of one or more of a text message, an email, and an audio message; displaying a previous version of the document without the tracked change and a current version of the document with the tracked change within the conversation related to the document; displaying the tracked change within the conversation related to the document using one or more of a textual scheme, highlighting scheme, color scheme, shading scheme, and a graphic scheme; in response to termination of the conversation, terminating tracking of changes with the document; and/or presenting at least one other document within the user interface associated with the document editor, where the conversation is related to all presented documents.

According to further examples, a computer-readable memory device with instructions stored thereon to provide collaboration communication tools within a document editor is described. The instructions may include presenting documents and a communication panel associated with the documents, where the communication panel presents a conversation related to the documents within a user interface associated with the document editor; detecting a new entry for an insertion into the conversation related to one of the documents; inserting the new entry into the conversation related to the one of the documents; linking the new entry to a specific location within the one of the documents; detecting a change within another one of the documents; tracking the change within the other one of the documents; and displaying the new entry, the link to the specific location within the one of the documents, and a reference to the tracked change within the conversation related to the documents.

According to yet other examples, the instructions may also include detecting a relationship between at least two of the presented documents, where the relationship includes one or more of: a related title, a related author, a related subject, and one or more related components; and displaying summary information associated with the detected relationship within the conversation related to the documents. The instructions may further include presenting summary information associated with a collaboration on the presented documents within the conversation.

The above specification, examples and data provide a complete description of the manufacture and use of the composition of the embodiments. Although the subject matter has been described in language specific to structural features and % or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide collaboration communication tools within a document editor, the computing device comprising:
    a memory configured to store instructions associated with a document authoring application;
    one or more processors coupled to the memory, the one or more processors executing the document authoring application in conjunction with the instructions stored in the memory, wherein the one or more processors are configured to:
        obtain communications and conversations associated with a document from different applications;
        aggregate the obtained communications and conversations for presentation in conjunction with the document;
        provide for display a document and a communication panel associated with the document on a user interface associated with the document authoring application, wherein the communication panel includes a particular conversation between a first collaborator and a second collaborator related to the document;
        in response to detecting a new entry associated with the particular conversation, insert the new entry into the particular conversation for display within the communication panel of the user interface, linking the new entry with a specific location in the document;
        in response to detecting a change to the document, track the change in the document for display within the communication panel of the user interface;
        receive a request to add a third collaborator to the particular conversation through the communication panel of the user interface;
        notify the third collaborator of an availability to join the particular conversation; and
        in response to the third collaborator joining the particular conversation, provide only a portion of the particular conversation related to the third collaborator or only a portion of the conversation following the joining of the third collaborator to a communication application associated with the third collaborator for display.

2. The computing device of claim 1, wherein the one or more processors are further configured to:
    transmit the particular conversation related to the document to a communication application executed on another computing device and associated with one or more of the first collaborator and the second collaborator to prompt the communication application to present the particular conversation related to the document to one or more of the first collaborator and the second collaborator.

3. The computing device of claim 2, wherein the one or more processors are further configured to:
    receive the new entry from the communication application.

4. The computing device of claim 1, wherein the one or more processors are further configured to:
    upon receipt of the request to add the third collaborator to the particular conversation, provide to be displayed a participant search panel to enable an identification of the third collaborator; and
    detect an input into the participant search panel that identifies the third collaborator.

5. The computing device of claim 4, wherein the request to add the third collaborator to the particular conversation is received
    in connection with the change to the document.

6. The computing device of claim 4, wherein the one or more processors are further configured to:
    identify the communication application associated with the third collaborator; and
    transmit the particular conversation related to the document to the communication application to prompt the communication application to display the portion of the particular conversation related to the third collaborator.

7. The computing device of claim 6, wherein the one or more processors are further configured to:
    enable the third collaborator to access the change to the document through a user interface of the communication application.

8. The computing device of claim 6, wherein the one or more processors are further configured to:
    enable the third collaborator to activate the document authoring application through a user interface of the communication application; and
    enable the third collaborator to access the change to the document through the user interface of the document authoring application.

9. The computing device of claim 1, wherein the one or more processors are further configured to:
    provide for display, through the user interface of the document authoring application, an identification and one or more properties of the document and the particular conversation related to the document.

10. The computing device of claim 1, wherein the one or more processors are further configured to:
    detect insertion of an attachment within the particular conversation related to the document;
    associate the attachment with the document by one or more of embedding the attachment as an object into the document and inserting a link to the attachment into the document; and
    notify one or more of the first collaborator, the second collaborator, and the third collaborator about the attachment.

11. The computing device of claim 10, wherein the one or more processors are further configured to:
    analyze a metadata associated with the attachment;
    compare the metadata associated with the attachment to a metadata associated with the document to identify a relationship between the document and the attachment, wherein the relationship includes one or more of: a related title, a related author, a related subject, and one or more related components; and present the identified relationship in the particular conversation related to the document.

12. A method executed on a computing device to provide collaboration communication tools within a document editor, the method comprising:

obtaining communications and conversations associated with a document from different applications;

aggregating the obtained communications and conversations for presentation in conjunction with the document;

providing for display a document and a communication panel associated with the document on a user interface associated with the document editor, wherein the communication panel includes a particular conversation between a first collaborator and a second collaborator related to the document;

in response to detecting a new entry associated with the particular conversation related to the document, inserting the new entry into the particular conversation related to the document for display within the communication panel of the user interface, linking the new entry to a specific location within the document;

in response to detecting a change within the document, tracking the change within the document for display within the communication panel;

receiving a request to add a third collaborator to the particular conversation through the communication panel of the user interface;

notifying the third collaborator of an availability to join the particular conversation; and in response to the third collaborator joining the particular conversation; and providing only a portion of the particular conversation related to the third collaborator or only a portion of the conversation following the joining of the third collaborator to a communication application associated with the third collaborator for display.

13. The method of claim 12, further comprising:

providing a notification to one or more of the first collaborator and the second collaborator about the tracked change.

14. The method of claim 13, further comprising:

providing the notification through a communication application associated with one or more of the first collaborator and the second collaborator in form of one or more of a text message, an email, and an audio message.

15. The method of claim 12, further comprising:

displaying a previous version of the document without the tracked change and a current version of the document with the tracked change within the particular conversation related to the document.

16. The method of claim 12, further comprising:

displaying the tracked change within the particular conversation related to the document using one or more of a textual scheme, highlighting scheme, color scheme, shading scheme, and a graphic scheme; and in response to termination of the particular conversation, terminating tracking of changes with the document.

17. The method of claim 12, further comprising:

providing to be displayed at least one other document within the user interface associated with the document editor, wherein the particular conversation is related to all displayed documents.

18. A computer-readable memory device with instructions stored thereon to provide collaboration communication tools within a document editor, the instructions comprising:

obtaining communications and conversations associated with a document from different applications;

aggregating the obtained communications and conversations for presentation in conjunction with the document;

providing to be displayed documents and a communication panel associated with the documents on a user interface associated with the document editor, wherein the communication panel includes a particular conversation between a first collaborator and a second collaborator related to the documents;

in response to detecting a new entry associated with the particular conversation related to one of the documents, inserting the new entry into the particular conversation for display within the communication panel of the user interface, linking the new entry to a specific location within the one of the documents; in response to detecting a change within another of the documents, tracking the change within the other one of the documents for display within the communication panel;

receiving a request to add a third collaborator to the particular conversation through the communication panel of the user interface;

notifying the third collaborator of an availability to join the particular conversation; and in response to the third collaborator joining the particular conversation, providing only a portion of the particular conversation related to the third collaborator or only a portion of the conversation following the joining of the third collaborator to a communication application associated with the third collaborator for display.

19. The computer-readable memory device of claim 18, wherein the instructions further comprise:

detecting a relationship between at least two of the documents, wherein the relationship includes one or more of: a related title, a related author, a related subject, and one or more related components; and displaying summary information associated with the detected relationship within the particular conversation related to the documents.

20. The computer-readable memory device of claim 18, wherein the instructions further comprise:

providing to be displayed summary information associated with a collaboration on the documents within the particular conversation.

* * * * *